United States Patent

[11] 3,563,153

| [72] | Inventor | Koichiro Watanabe<br>Tokyo-To, Japan |
|---|---|---|
| [21] | Appl. No. | 754,435 |
| [22] | Filed | Aug. 21, 1968 |
| [45] | Patented | Feb. 16, 1971 |
| [73] | Assignee | Asahi Kogaku Kogyo Kabushiki Kaisha<br>Tokyo-To, Japan |
| [32] | Priority | Sept. 21, 1967 |
| [33] | | Japan |
| [31] | | 42/60745 |

[54] CAMERA LIGHT MEASURING SYSTEM
6 Claims, 3 Drawing Figs.

[52] U.S. Cl. ................................................. 95/64,
95/10
[51] Int. Cl. ................................................. G03b 7/02
[50] Field of Search ................................................. 95/10 (C),
64 (B), (Inquired)

[56] References Cited
UNITED STATES PATENTS
2,935,921  5/1960  Rentschler ................... 95/10(C)

3,194,134  7/1965  Swarofsky et al. ............ 95/10(C)
3,368,468  2/1968  Rentschler ................... 95/10(C)
3,461,783  8/1969  Fujii ............................ 95/10(C)

*Primary Examiner*—Samuel S. Matthews
*Assistant Examiner*—M. L. Gellner
*Attorney*—Stanley Wolder ABSTRACT: A system for measuring the light through a camera lens under diaphragm-open and diaphragm-adjusted positions includes a photoresistor located behind the diaphragm and connected to a meter through a bridge network including in an arm thereof one of a pair of outputs of a variable resistor device. The variable resistor device includes a cylindrical resistance element angularly adjustable in accordance with shutter speed and film rating, a movable contact engaging the resistance element and movable in response to the preset value of the diaphragm and a stationary second contact engaging the resistance element at a point corresponding to diaphragm-open position. A switch is actuatable to alternatively connect the first and second contacts into the circuit with the full opening and adjusted closing of the diaphragm respectively.

PATENTED FEB 16 1971

3,563,153

INVENTOR
KOICHIRO WATANABE
BY *Stanley Wolder*
ATTORNEY

CAMERA LIGHT MEASURING SYSTEM

BACKGROUND OF THE INVENTION

The present invention relates generally to improvements in light measurement and it relates particularly to an improved camera through the lens light-measuring system operable under diaphragm fully open and diaphragm-adjusted positions.

In through the lens light-measuring systems, that is where the light passing through the camera lens is measured, two different procedures are conventionally employed, one in which the light is measured with the objective lens diaphragm in its fully open position and the other with the objective lens diaphragm in a stopped down or adjusted condition. Both these light-measuring procedures possess respective drawbacks and certain advantages. Thus when the light is measured under the diaphragm fully open condition, the viewed image is at maximum brightness thereby greatly facilitating precise focusing and viewing, particularly under low ambient light conditions, and minimizes the adverse effect of light entering through the viewing eyepiece. However, with the diaphragm fully open, the depth of focus cannot be visually ascertained for the diaphragm adjusted position, and a diaphragm adjustment error may result consequent to the photographic operation since the diaphragm adjusting operation is not current with light measurement. On the other hand, while the depth of focus may be concurrently visually ascertained with light measurement under photographing conditions with the diaphragm adjusted, the rangefinding and viewing conditions are inferior. Thus the conventional through the lens light-measuring systems are compromises, and have complementing advantages and drawbacks.

SUMMARY OF THE INVENTION

It is thus a principal object of the present invention to provide an improved light-measuring system.

Another object of the present invention is to provide an improved camera through the lens light-measuring system.

Still another object of the present invention is to provide an improved camera through the lens light-measuring system which possesses the advantages of open diaphragm and stopped down diaphragm light-measuring operations and overcomes the drawbacks of such operations.

A further object of the present invention is to provide a light-measuring system of the above nature characterized by its reliability, versatility convenience and adaptability.

The above and other objects of the present invention will become apparent from a reading of the following description taken in conjunction with the accompanying drawing, which illustrates a preferred embodiment thereof.

In a sense the present invention contemplates the provision of a camera light-measuring system comprising an adjustable diaphragm, a photosensitive element exposed to light traversing said diaphragm, a current meter, a resistance network having a pair of first and second outputs alternatively connected in circuit with said photosensitive element and a pair of first and second resistance adjustments, one of said outputs responding to said pair of adjustments and the other of said outputs responding to only one of said adjustments, and means for selectively connecting one of said outputs into said circuit.

In its preferred form and as employed in a single lens reflex camera provided with an objective lens with an automatic preset diaphragm, a photoresistor is disposed behind the diaphragm and forms one arm of a bridge another arm of which is a variable resistance network in accordance with the present invention, a battery and a sensitive current meter being connected between respective opposite bridge corners. The resistance network comprises a rotatable cylindrical resistance element, a first movable contact element and a second stationary contact element slidably engaging the resistance element. A double throw switch includes an arm defining one output terminal of the resistance network, the other terminal being connected to an end of the resistance element. The opposite first and second switch poles are connected to the resistor first and second contacts respectively. The resistance first contact is coupled to the diaphragm preset control so as to be adjustable therewith and the second contact is located at a position corresponding to the first contact diaphragm fully open position. Means are provided to actuate the switch concurrently with the automatic diaphragm so that the first pole is closed with the diaphragm stopped down condition. Means are provided for independently adjusting the resistor first contact in the absence of coupling to the diaphragm preset control. The resistance element is adjusted in accordance with the shutter speed and film speed rating.

The improved light-measuring system possesses the advantages of the open diaphragm and stopped down diaphragm light measurement and avoids the drawbacks thereof. Accurate light measurements may be achieved therewith under both positions of the diaphragm and adjustments made under optimum conditions.

DESCRIPTION OF THE PREFERRED EMBODIMENT

Figure 1:
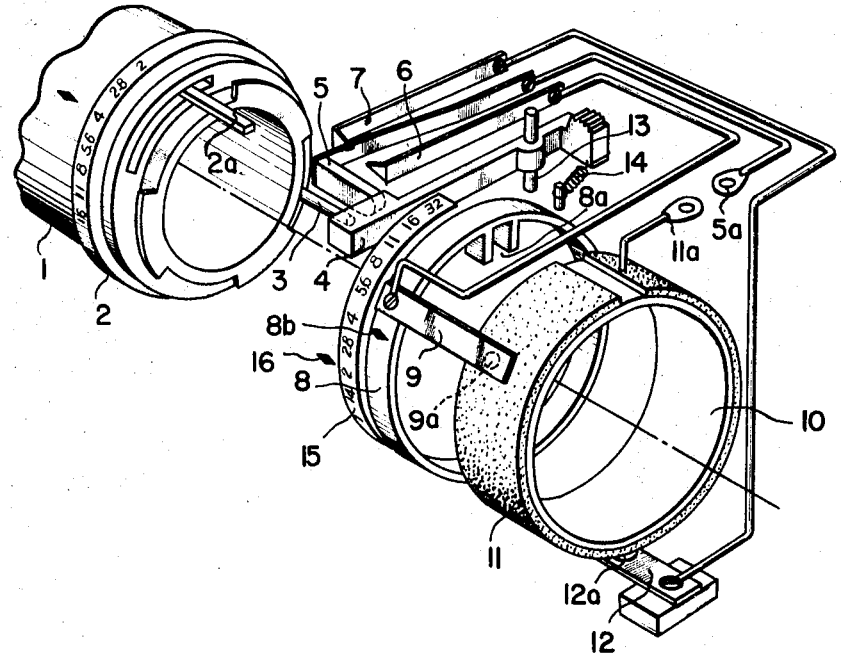
FIG. 1 is a fragmentary perspective view of a preferred embodiment of the present invention.

Referring now to the drawing, which illustrates a preferred embodiment of the present invention, reference numeral 1 generally designates an objective lens barrel of known construction which is associated with a single lens reflex camera which houses the improved light-measuring system. The objective lens 1 is of the automatic preset type and is provided with an adjustable diaphragm 1a whose stopped-down position is adjusted or preset in the known manner by a diaphragm ring 2 mounted on the lens barrel 1, a coupling bar or pin 2a projecting rearwardly from barrel 1 and movable with ring 2. A rearwardly projecting diaphragm-actuating pin 3 is associated with the diaphragm 1a so that forward movement or depression of pin 3 effects a stopping down of the diaphragm 1a to the value preset by ring 2 and rearward movement or release thereof effects the full opening of diaphragm 1a.

The light-measuring network includes a photosensitive element Ro positioned behind the diaphragm 1a in the path of light through the objective lens and forming an arm of a bridge circuit, an adjacent arm of which is formed, according to the present invention, by the resistance network Rv and the other arms of which are formed by resistors $R_1$ and $R_2$. A sensitive current meter or galvanometer A is connected between one pair of opposite corners of the bridge, and a battery Batt. is connected through a switch Sw between the other pair of bridge opposite corners.

The resistance network Rv includes an externally angularly adjustable cylindrical ring 10 which supports on its outer face for rotation therewith a transversely split cylindrical resistance element 11 one end of which is connected to a terminal 11a. The ring 10 and resistance element 11 are angularly adjustable in accordance with photographing parameters other than the lens diaphragm opening, specifically, for example, in accordance with the camera shutter speed and the film speed rating. A resilient conductor arm 12 is mounted at one end thereof and carries at its free end a contact element 12a which slidably engages the resistance element 11.

An angularly adjustable ring 8 is coaxial with and located forwardly of the ring 10 and supports a rearwardly directed resilient conductor arm 9 provided at its free end with a contact element 9a which slidably engages the resistance element 11 at a position shortly forwardly offset from the contact element 12a. The ring is provided on its inner face with a coupling section 8a defined by a pair of peripherally spaced inwardly directed radial arms delineating a coupling recess, the coupling section 8a being longitudinally axially engageable with the arm 2a, so when the objective lens 1 is in coupled position, arm 2a and coupling section 8a are interengaged and the diaphragm preset ring 2 and ring 8 are concurrently angularly adjusted.

A double throw switch includes a resilient switch arm 5 rearwardly sprung and provided at its free end with a rearwardly directed finger. Resilient switch pole legs 6 and 7 are substantially parallel with and positioned rearwardly and forwardly respectively of switch arm 5 and are provided with contact fingers at their free ends directed toward the arm 5 and alternatively engaged thereby. The switch arm 5 is connected to a terminal 5a, the switch pole 6 is connected to contact 9a through arm 9 and the switch pole 7 is connected to contact 12a through arm 12.

A selector lever 4 is pivoted between its ends to a shaft 13 about which it is swingable. One end of the lever 4 bears on the end of the diaphragm actuating finger 3 and on the rear end of the finger on switch arm 5, and the other end of the lever 4 includes a finger piece and is engaged by a tension spring 14 to normally urge the opposite end of the lever 4 forwardly to depress finger 3 and to advance switch arm 5 into an engagement with switch pole 7. Depression of the lever finger piece releases finger 3 and switch arm 5 to their retracted positions.

A rotatable diaphragm scale ring 15 is provided for setting the ring 8 to the desired diaphragm value when the employed objective barrel 1 is not provided with the coupling pin 2a. When the ring 15 is so rotated as to bring the scale point thereof corresponding to the fully open diaphragm value of the objective barrel employed into registration with a fixed index 16, the arrangement is prepared for fully open diaphragm measurement. In the state as shown in FIG. 1, the arrangement is set to the fully open diaphragm value F2 and the desired diaphragm value F4.

Figure 2:
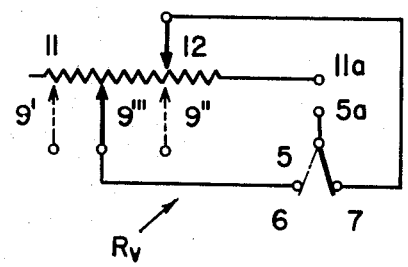
FIG. 2 is a circuit diagram of the resistor section thereof.
Figure 3:
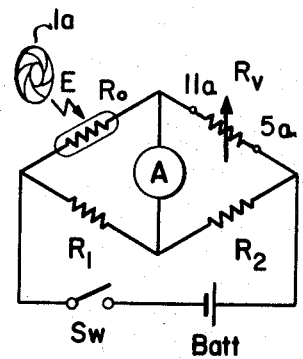
FIG. 3 is a circuit diagram of the light-measuring network of which the resistor component forms a part.

In the fully open diaphragm light measurement operation, first the objective barrel 1 is attached, then the lever 4 is so moved that the switch arm member 5 is brought into contact with the switch pole member 6 and the diaphragm is fully opened. If the objective barrel is not provided with the pin 2a, then the ring 15 is rotated to bring the fully open diaphragm value thereof (which is equal to that of the objective barrel scale) into registration with the index 16 and the index 8b of the ring 8 is brought into registration with the desired diaphragm value of the ring 15. Then E, as illustrated in FIG. 3, is the incident light amount due to fully open diaphragm, and the output resistance of network Rv corresponds to the resistance between the contact member 9a and the resistance element terminal 11a. In FIG. 2 the position of the contact member 9 is shown in the following three cases: The position 9' corresponding to the smallest diaphragm aperture, the position 9'' corresponding to the fully open diaphragm aperture, and the position 9''' corresponding to the desired diaphragm aperture. If the objective barrel is not provided with an automatic diaphragm stop-down arrangement, namely an arrangement which is coupled to the pin 3, the diaphragm stop-down operation is manually performed after light measurement.

In stopped-down diaphragm light measurement, the lever 4 is released and advanced by spring 14 so that the switch arm member 5 is brought into contact with the switch pole member 7 and the diaphragm blades are stopped down. Then, the light amount E, as shown in FIG. 3, represents the light passing through the stopped-down diaphragm; and the output resistance of network Rv represents the resistance between the contact member 12a and the resistance element lead terminal 11a which is not coupled to the diaphragm member. The stopped-down diaphragm light measurement contact member 12a is positioned near the point 9'' since it is when fully open diaphragm aperture photographing is desired that the fully open diaphragm measurement and the stopped-down diaphragm measurement are carried out in the same state, and when the diaphragm is stopped down, it may be assumed that the light amount from outside is diminished. The angular displacements of the rings 8 and 10, the positional relationship of the contact members 9 and 12 and the value of the resistor member 11 are so adjusted that the indication of the galvanometer A of the fully open diaphragm measurement coincides with that of the stopped-down diaphragm measurement.

Thus, the advantage of the present system is as follows: With an arrangement wherein a pin 2a is provided for transmitting the diaphragm value to the light measurement means, it is possible to accomplish changeover between the fully open light measurement and the stopped-down diaphragm light measurement by means of a simple arrangement; while, when coupling of the pin 2a to the light measurement means is omitted or absent, as in the case of employing an objective barrel not provided with such pin 2a or in the cases of microscopic or close-range photographing, the stopped-down diaphragm light measurement can be performed automatically.

While there has been described and illustrated a preferred embodiment of the present invention, it is apparent that numerous alterations, omissions and additions may be made without departing from the spirit thereof.

I claim:

1. A camera light-measuring system comprising an adjustable diaphragm; a photosensitive element exposed to light traversing said diaphragm, a current meter, a resistance network having a pair of first and second outputs alternatively connected in circuit with said photosensitive element and a pair of first and second resistance adjustments one of said outputs responding to said pair of adjustments and the other of said outputs responding to only one of said adjustments, and means for selectively connecting one of said outputs into said circuit, said resistance network comprising a variable resistor including a movable resistance element defining said first adjustment, an independently adjustable first contact element defining said second adjustment, and a stationary second contact element engaging said resistance element, said resistance element being movable relative to said stationary contact element, said first output being between said first contact element and a predetermined point on said resistance element and said second output being between said second contact element and said predetermined point.

2. The light-measuring system of claim 1 wherein said diaphragm includes presetting means and comprising means coupling said diaphragm presetting means to said first contact element.

3. The light-measuring system of claim 1 comprising an automatic preset diaphragm mechanism coupled to said diaphragm and including a first control element movable in response to said diaphragm preset value and coupled to and movable with said first contact element, and a second control element for alternatively moving said diaphragm to its fully open position and its preset position and actuable with said selective output-connecting means to connect said first output into said circuit with the fully open position of said diaphragm and to connect said second output into said circuit with the closing of said diaphragm to its preset position.

4. The light-measuring system of claim 3 wherein said stationary second contact element engages said resistance element at a position corresponding to that engaged by said movable first contact element when adjusted to said diaphragm fully open position.

5. The light-measuring system of claim 2 wherein said resistance element is of arcuate configuration and rotatable about its longitudinal axis coaxial with the longitudinal axis of said diaphragm.

6. The light-measuring system of claim 1 wherein said first contact element is adjustable to positions corresponding to diaphragm aperture positions and said second contact element engages said resistance element at a position corresponding to the diaphragm fully open position of said first contact element.